(12) United States Patent
Karun et al.

(10) Patent No.: US 7,870,112 B2
(45) Date of Patent: Jan. 11, 2011

(54) EFFICIENT MEMORY USAGE FOR UNIFIED DOCUMENT OBJECT MODEL IMPLEMENTATION FOR JAVA

(75) Inventors: K Karun, Sammamish, WA (US); Kongyi Zhou, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 294 days.

(21) Appl. No.: 10/880,950

(22) Filed: Jun. 30, 2004

(65) Prior Publication Data

US 2006/0005119 A1   Jan. 5, 2006

(51) Int. Cl.
*G06F 7/00* (2006.01)
*G06F 17/30* (2006.01)

(52) U.S. Cl. ................ 707/705; 707/802
(58) Field of Classification Search ............ 707/100, 707/101, 705, 802
See application file for complete search history.

(56) References Cited

U.S. PATENT DOCUMENTS

| | | | | |
|---|---|---|---|---|
| 6,635,089 B1* | 10/2003 | Burkett et al. | | 715/235 |
| 6,654,761 B2* | 11/2003 | Tenev et al. | | 707/102 |
| 6,938,204 B1* | 8/2005 | Hind et al. | | 715/234 |
| 6,973,460 B1* | 12/2005 | Mitra | | 707/103 R |
| 6,981,212 B1* | 12/2005 | Claussen et al. | | 715/205 |
| 7,047,318 B1* | 5/2006 | Svedloff | | 709/246 |
| 7,058,651 B2* | 6/2006 | Hembry et al. | | 707/102 |
| 7,266,766 B1* | 9/2007 | Claussen et al. | | 715/234 |
| 2004/0148565 A1* | 7/2004 | Davis et al. | | 715/501.1 |
| 2005/0138048 A1* | 6/2005 | Jin et al. | | 707/100 |
| 2005/0138052 A1* | 6/2005 | Zhou et al. | | 707/101 |
| 2005/0160110 A1* | 7/2005 | Charlet et al. | | 707/102 |
| 2005/0187973 A1* | 8/2005 | Brychell et al. | | 707/104.1 |

OTHER PUBLICATIONS

David Eng, "Combining Static and Dynamic data in Code Visualization", Nov. 18-19, 2002, ACM, pp. 43-50.*

* cited by examiner

*Primary Examiner*—Etienne P LeRoux
*Assistant Examiner*—Jared M Bibbee
(74) *Attorney, Agent, or Firm*—Aka Chan LLP (57) ABSTRACT

Methods and apparatus for enabling an object associated with an XML node class to be used for both a document object model (DOM) application programming interface (API) that supports an in-memory representation of XML nodes and a DOM API that supports a database-backed representation of XML nodes are disclosed. According to one aspect of the present invention, a method for creating an object that represents an XML node in a Java space includes determining whether the object is to represent a pure node. An object of a first class is created to represent a database-backed node when the object is not determined to represent the pure node, and the object of the first class is created to represent a pure node when the object is determined to represent the pure node. The object includes the same set of fields whether the object represents a pure node or a database-backed node.

60 Claims, 8 Drawing Sheets

Class XML Node
{
    long     nodeId; ~302
    Object[ ] data; ~306
    int      flags; ~308
}

EFFICIENT MEMORY USAGE FOR UNIFIED DOCUMENT OBJECT MODEL IMPLEMENTATION FOR JAVA

BACKGROUND OF THE INVENTION

1. Field of Invention

The present invention relates to database systems. More specifically, the invention relates to the efficiently allocating memory in a document object model implementation for Java so that Java objects representing XML nodes may contain the same set of fields for both in-memory and database-backed representations.

2. Description of the Related Art

The use of Java platforms in conjunction with XML databases increasing and, as a result, many XML developer kits for Java are becoming readily available. A Java XML developer kit is generally a collection of tools that are used for XML data processing. Functionalities that are typically included in a Java XML developer kit include, but are not limited to, XML parsing, XSLT transformation, XML schema validation, and DTD validation, as will be appreciated by those skilled in the art. A Java XML developer kit also provides a document object model (DOM), as well as an application programming interface (API) for XML and a Java class binding API for manipulating XML data.

A Java XML developer kit generally represents XML data as tree structures of XML nodes. Typically, an XML node stores data such as a name of the node, the namespace associated with the node, text associated with the node, and attribute values associated with the node. An XML node also stores links to an owner document, a parent node, and any associated children or sibling nodes. While most implementations of an XML node generally maintain information such as the name of the node, the namespace associated with the node, text associated with the node, and attribute values associated with the node, as well as information pertaining to associated documents or nodes, the mechanism used to maintain such information generally depends upon factors which include, but are not limited to, the optimization of memory use.

When an object that represents an XML node is associated with an implementation that uses only local memory, e.g., when an object includes information that is all within the same Java space as the object, the object includes fields in which such information may be stored. Alternatively, when an object that represents an XML node is associated with an implementation that uses a database, e.g., when an object includes information that is stored in a database, the object uses a small number of fields to contain pointers to information stored in the database. Hence, an in-memory representation of an XML node, i.e., an object that uses only local memory, typically uses more memory resources than a database-backed representation of an XML node.

Figure 1A:
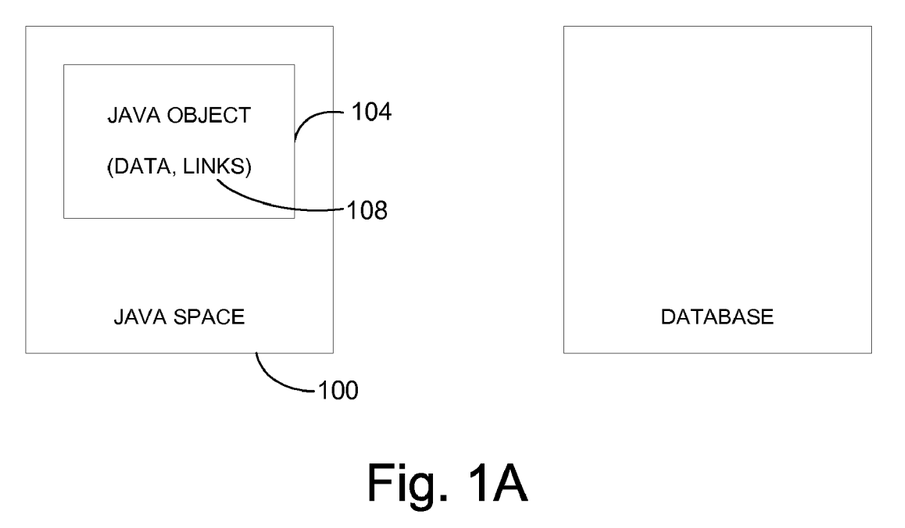
FIG. 1a is a diagrammatic representation of a Java space environment with a Java object.

As previously mentioned, in a Java space environment, or a Java in-memory implementation of an XML node, an XML node is typically represented as a Java object with fields which contain the data and the links associated with the XML node. In many Java XML developer kits, while streaming input and output which may be used to read and to write XML data into or read XML data from a database are supported, the XML data processed and represented as in-memory Java objects in a Java space, and there is effectively no direct interaction with the database. FIG. 1a is a diagrammatic representation of a Java space environment with a Java object. A Java object 108 that contains XML data, i.e., represents an XML node, is present in a Java space 100. Java object 108 includes XML data and links 108 to associated elements such as child elements which may contain comments and attributes associated with Java object 108. Typically, XML data and links in Java object 108 are stored in multiple fields, i.e., fields in Java object 108 are used to store each piece of information associated with Java object 108.

Figure 1B:
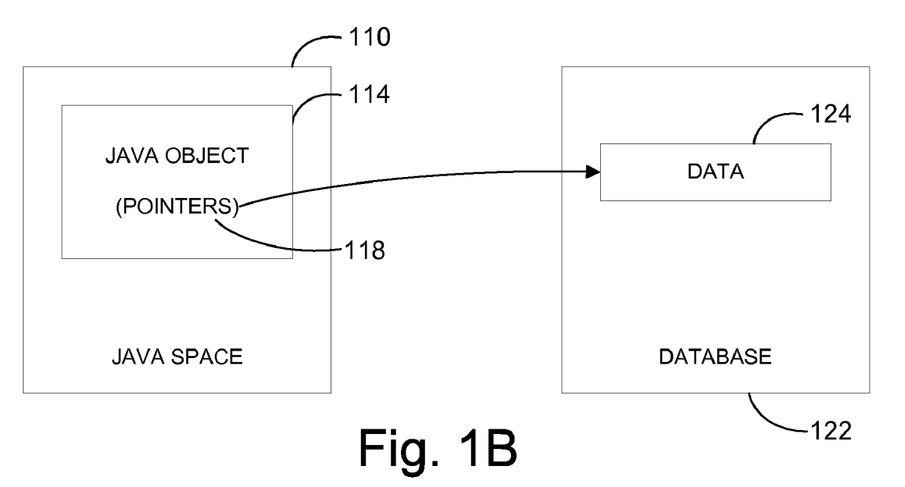
FIG. 1b is a diagrammatic representation of a Java space environment with a Java object which is substantially backed by a database.

While an in-memory Java object such as Java object 108 is highly functional, and may be efficiently processed using memory processing, such an object is not highly scaleable, as such an object is typically of a fixed size, and it may not always be possible to increase the size of the object enough to accommodate a desired amount of data. In order for objects which represent XML nodes to be scaleable, database-backed objects may be used to represent XML nodes. A database-backed object generally includes fields which hold pointers to data that is stored in a database. FIG. 1b is a diagrammatic representation of a Java space environment with a Java object which is substantially backed by a database. A Java object 114 is present in a Java space 110, and includes pointers 118 which point to data 124 that is stored in a database 122. Since data 124 is stored in database 122 rather than in fields within Java object 114, a significant amount of data 124 may effectively be associated with Java object 114. In other words, by storing data 124 within database 122, Java object 114 is scaleable in that the amount of data 124 associated with Java object 114 is not constrained by the size of Java object 114. Although a database-backed Java object such as Java object 114 is highly scaleable, database processing may be relatively slow compared to memory processing.

Depending on whether in-memory representations of XML data, i.e., in-memory Java objects, or database-backed representations of XML data, i.e., database-backed Java objects, are used, an appropriate DOM API set may be used by application developers. That is, specific sets of DOM APIs are used for different kinds of XML nodes. Hence, if an XML node is represented as an in-memory Java object, that XML node may not be used with a DOM API that are appropriate for database-backed representations of objects. Similarly, if an XML node is represented as a database-backed Java object, that XML node may not be used with a DOM API that is appropriate for in-memory representations of objects.

The inability for a single unified implementation to be used for in-memory representations of objects with database-backed representations of objects often limits developers, as many systems may not be compatible due to different representations of XML nodes. In order for a developer to enable a system which expects one type of object representation to accept a different type of object representation such that there is effectively interoperability relating to different object representations, significant changes to source code are often required, which is inefficient.

Therefore, what is needed is a method and an apparatus that allows a single DOM API set to be used to with both an in-memory representation of XML data and a database-backed representation of XML data. That is, what is desired is a system which effectively enables an object which represents an XML node to be compatible with both an in-memory representation of XML data and a database-backed representation of XML data.

SUMMARY OF THE INVENTION

The present invention relates to a Java object which represents an XML node, and is of an XML node type that may be used for both a document object model (DOM) application programming interface (API) that supports an in-memory representation of XML nodes and a DOM API that supports a database-backed representation of XML nodes. According to one aspect of the present invention, a method for creating an object that represents an XML node in a Java space includes determining whether the object is to represent a pure node or a database-backed node. A pure node is arranged to include information that is substantially all in the space, while a database-backed node is arranged to reference information that is outside of the space. An object of a first class is created to represent a database-backed node when the object is not determined to represent the pure node, and the object of the first class is created to represent a pure node when the object is determined to represent the pure node.

In one embodiment, the method includes setting a first flag in the object. When the object is not determined to represent the pure node, the first flag is set to indicate that the object represents the database-backed node. Alternatively, when the object is determined to represent the pure node, the first flag is set to indicate that the object represents the pure node. In another embodiment, creating the object also includes creating a node identifier field that is a long integer field in the object, creating a data array field in the object, and creating an integer field to hold flags in the object.

A Java object which either includes all fields associated with a pure Java or in-memory representation of an XML node and a database-backed representation of an XML object, or includes an intersection of the fields associated with a pure Java representation may be used with respect to a DOM API which uses pure Java representations of data and a DOM API which uses database-backed representations of data. Hence, an end user is effectively presented with a unified implementation view of an XML node regardless of whether the XML node is associated with a pure Java implementation, or with a database-backed implementation.

According to another aspect of the present invention, a system includes a processor and a memory space, e.g., a Java memory space. The memory space is associated with the processor, and is arranged to contain a first object. The first object represents an XML node, and is suitable for use for both an in-memory implementation and a database-backed implementation of the XML node. In one embodiment, the first object includes a node identifier field, a data array field, and a flags field. In such an embodiment, a flag in the flags field is arranged to indicate whether the first object is associated with the database-backed implementation of the XML node or with the in-memory implementation of the XML node.

Other features and advantages of the invention will become readily available apparent upon review of the following description in association with the accompanying drawings, where the same or similar structures are designated with the same reference numerals.

BRIEF DESCRIPTION OF THE DRAWINGS

The invention may best be understood by reference to the following description taken in conjunction with the accompanying drawings in which.

DETAILED DESCRIPTION OF THE EMBODIMENTS

In the description that follows, the present invention will be described in reference to embodiments that test subsystems on a platform for a software application, such as a database application. However, embodiments of the invention are not limited to any particular architecture, environment, application, or implementation. For example, although embodiments will be described in reference to database applications, the invention may be advantageously applied to any software application. Therefore, the description of the embodiments that follows is for purposes of illustration and not limitation.

The ability to effectively support multiple implementations of a document object model (DOM) application programming interface (API) allows for a substantially unified implementation view to be perceived by an end user. In other words, by supporting more than one implementation of a DOM API, the use of either a database-backed representation of an XML node or an in-memory representation of an XML node is such that the end user essentially does not perceive a difference between the two representations.

By creating a single object class which may be used to represent an XML node regardless of whether the XML node uses an in-memory representation of data or a database-backed representation of data, the fields associated with an object which represents an XML node are substantially the same for an in-memory representation and for a database-backed representation. Therefore, a unified DOM API may be used for in-memory representations of data and for database-backed representations of data, and interoperability issues may be substantially minimized.

In one embodiment, a Java object that represents an XML node may include substantially all fields associated with an in-memory implementation of the XML node and a database-backed implementation of the XML node. Such a unified implementation that allows a Java object that represents an XML node to be used for both a Java in-memory implementation and a database-backed implementation may effectively merge the fields associated with an in-memory implementation and a database-backed implementation. By including all fields associated with an in-memory implementation and all fields associated with a database-backed implementation in a Java object, the Java object is suitable for use as both an XML node for an in-memory implementation and as an XML node for a database-backed implementation. Hence, a single unified implementation view of the object that represents an XML node is provided to an end user regardless of whether the object is an XML node for an in-memory implementation or an XML node for a database-backed implementation, and a unified DOM implementation may be achieved.

Figure 2:
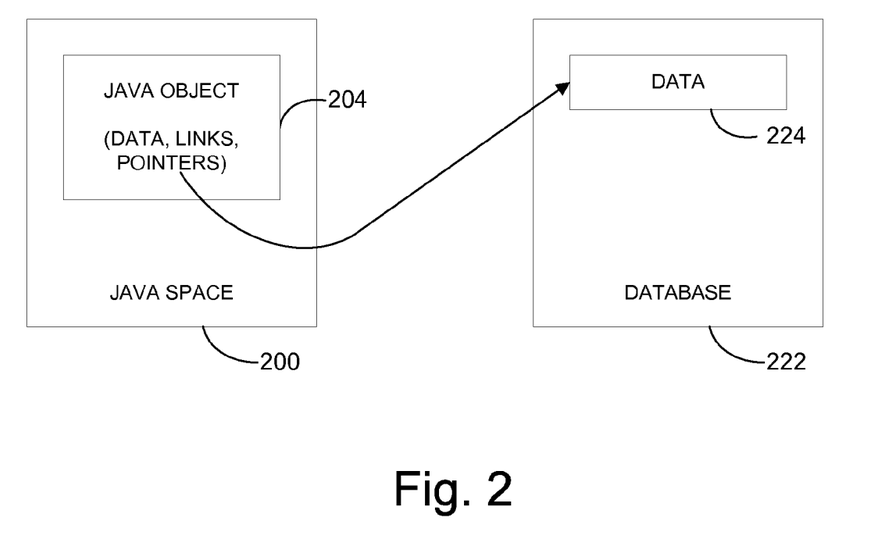
FIG. 2 is a diagrammatic block diagram representation of a Java object that represents an XML node in accordance with one embodiment of the present invention.

FIG. 2 is a diagrammatic block diagram representation of a Java object that represents an XML node in accordance with one embodiment of the present invention. A Java object 204 in a Java space 200 may generally be an XML node that includes fields for data and links that are typically used in a Java in-memory implementation, as well as fields for pointers to data 224 stored in a database 222, e.g., an XML database, that are typically used in a database-backed implementation. While object 204 is suitable for use as an XML node for both an in-memory implementation and a database-backed implementation, and to provide an end user of a single unified implementation view, the merger of all fields associated with an in-memory implementation, e.g., data and links, and all fields associated with a database-backed implementation, e.g., pointers to data 224, in object 204 results in an increase in the memory space allocated for object 204. That is, object 204 utilizes significantly more memory than a typical object used as an XML node in an in-memory implementation or a typical object used as an XML node in a database-backed implementation. The increase in memory usage may, in some cases, be inefficient and impractical. For example, in a system in which memory resources are relatively limited, increasing the amount of memory associated with an object that represents an XML node may not be practical.

Although merging the fields associated with an object used as an XML node in an in-memory representation and the fields associated with an object used as an XML node in a database-backed representation provides for an object that may be efficiently used in a unified DOM representation, reducing the number of fields in such an object allows for a more efficient use of memory. The number of fields in an object used in a unified DOM representation may be substantially minimized by including the intersection of the fields associated with an in-memory representation and the fields associated with a database-backed representation. In other words, rather than merging all fields associated with an in-memory representation and all fields associated with a database-backed representation in an object, the object may instead potentially include a subset of the fields associated with an in-memory representation and a subset of the fields associated with a database-backed representation such that the existence of substantially redundant, or unnecessary, fields may be minimized.

When a Java object includes the same set of fields for both an in-memory representation and a database-backed representation, but effectively includes the union or intersection of the fields associated with the in-memory representation and the database-backed representation, the fields may be interpreted differently depending upon whether the object is of an in-memory implementation or a database-backed implementation. An indicator may be stored within an object to identify whether the object is of an in-memory implementation or a database-backed implementation. In one embodiment, such an indicator may be a flag that indicates the type of implementation.

Figure 3:
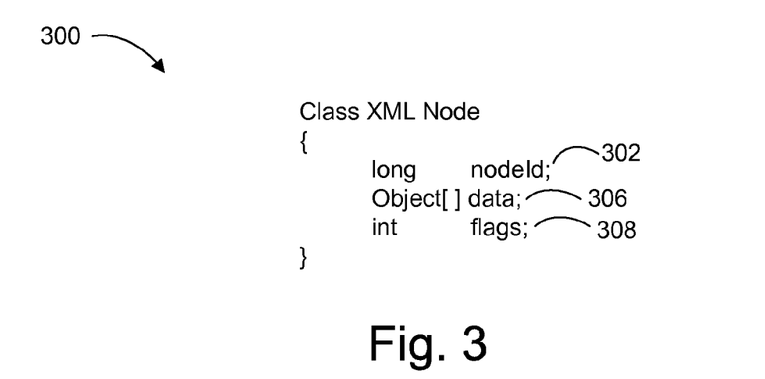
FIG. 3 is a diagrammatic representation of an XML node class which contains an intersection of fields associated with an in-memory backed representation of an XML node and a database-backed representation of an XML node in accordance with an embodiment of the present invention.

A class which defines an XML node that effectively contains the merger of fields associated with an in-memory backed representation of an XML node and a database-backed representation of an XML node is shown in FIG. 3. An XML node class 300 as defined as having a long integer value field 302, an object array field 306, and an integer field 308. Long integer value field 302 is generally arranged to contain a node ID, and object array field 306 is generally arranged to contain data, and integer field 308 is generally arranged to contain flags.

Figure 4:
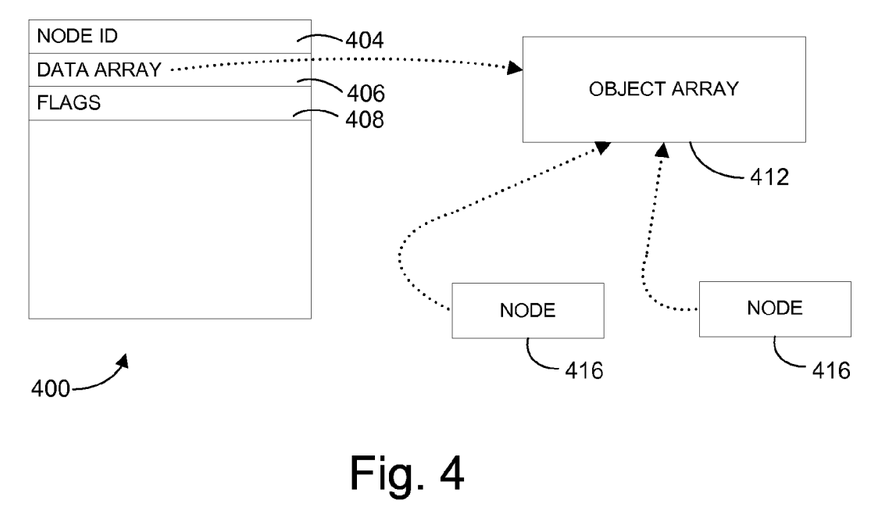
FIG. 4 is a diagrammatic representation of a Java object which represents an XML node in of a substantially unified implementation in accordance with an embodiment of the present invention.

FIG. 4 is a diagrammatic representation of a Java object which represents an XML node in of a substantially unified implementation in accordance with an embodiment of the present invention. An object 400, as defined in one embodiment by an XML node class shown in FIG. 3, includes a node ID field 404, a data array field 406, and a flags field 408. Node ID field 404 is arranged to hold a value, as for example an integer, that uniquely identifies an XML node that is represented by object 400.

Data array field 406 is arranged to include a reference to an object array 412, which is generally in the same memory space as object 400. Object array 412, which stores data associated with object 400, is shared by any number of nodes 416, or objects which represent XML nodes. Such an object array 412 may be local, e.g., within the same Java space as object 400. Data array field 406 also includes various other entries which may include, but are not limited to, an entry which points to the document (not shown) or document node which owns object 400. In one embodiment, the entry at index "0" of data array field 406 is arranged to point to the owner document (not shown) or document node, though any entry in data array field 406 may generally reference the owner document. Data array field 406 is also typically arranged to contain information such as links to parent, children, and sibling objects or nodes as appropriate. By way of example, for an in-memory implementation, data array field 406 typically contains links to parents, children, and sibling objects.

Flags field 408 is arranged to contain flags that may be used to identify an underlying representation, as well as representation specific flags. It should be appreciated that the representation specific flags typically include a flag which indicates whether an in-memory representation for object 400 has been implemented, or whether a database-backed representation for object 400 has been implemented.

Figure 5:
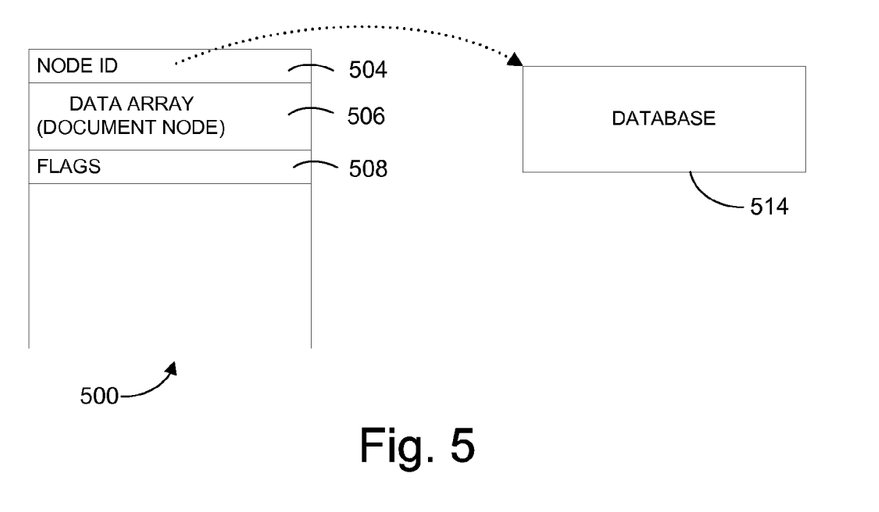
FIG. 5 is a diagrammatic representation of a Java object which represents an XML node in a system which supports database-backed representations of Java objects in accordance with an embodiment of the present invention.

While a Java object which represents an XML node in a system which supports a database-backed representation of XML nodes has substantially the same fields as a Java object which represents an XML node in a system which supports an in-memory representation of XML nodes, the purposes for which the fields are used generally vary. FIG. 5 is a diagrammatic representation of a Java object which represents an XML node in a system which supports database-backed representations of Java objects in accordance with an embodiment of the present invention. A Java object 500, which contains the same general fields as Java object 400 of FIG. 4, includes a node ID field 504, a data array field 506, and a flags field 508. Within object 500, node ID field 504 includes a pointer to data stored in a database 514. Data array field 506 contains a reference to the owner document node, and, in one embodiment, is of a size that enables data array field 506 to substantially only contain the reference to the owner document node. Flags field 508 is arranged to contain flags which include, but are not limited to, a flag which identifies object 500 as being of a database-backed implementation.

Figure 6:
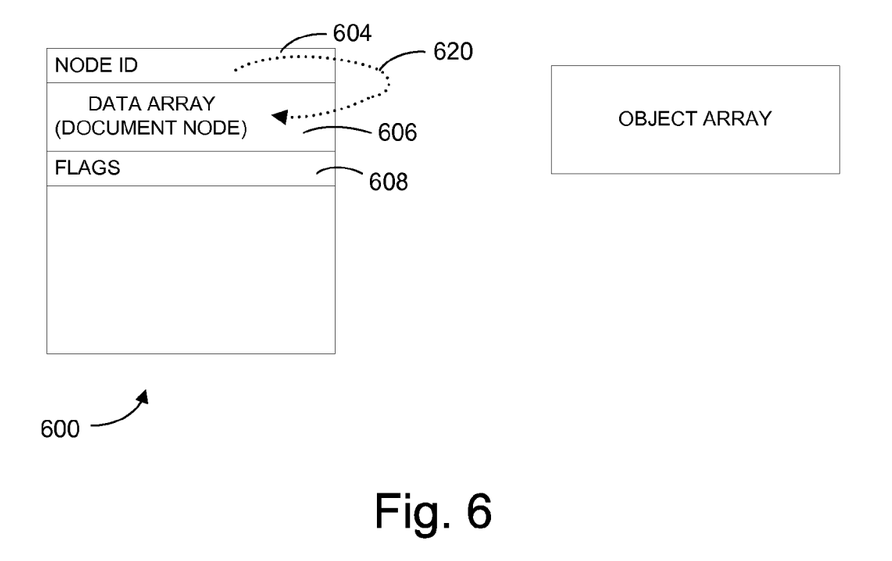
FIG. 6 is a diagrammatic representation of a Java object which represents an XML node in a system which supports in-memory representations of Java objects in accordance with an embodiment of the present invention.

When Java object 400 of FIG. 4 is arranged to be used as a part of an in-memory implementation, the contents associated with the fields of the object typically differ from the contents associated with a database-backed implementation. With reference to FIG. 6, a Java object which represents an XML node in a system which supports in-memory representations of Java objects will be described in accordance with an embodiment of the present invention. A Java object 600 includes a node ID field 604, a data array field 606, and a flags field 608. Node ID field 604 contains an index 620 into an object array associated with data array field 606. An object array associated with data array field 606 contains a document node, as for example at a zero offset. In addition to containing the document node, or information pertaining to the document node, data array field 606 includes other information such as links to any parent objects, child objects, or sibling objects associated with object 600.

Figure 7:
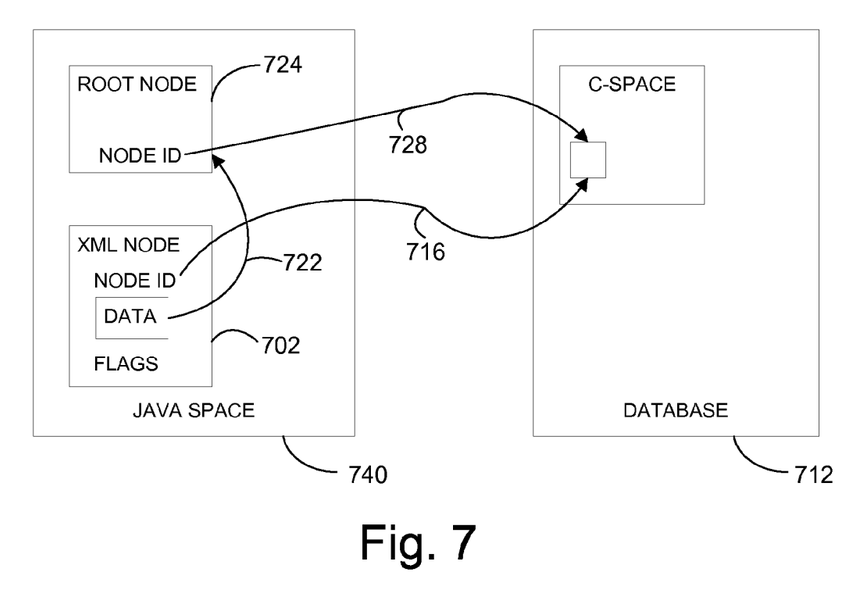
FIG. 7 is a diagrammatic representation of an XML node which references a database in accordance with an embodiment of the present invention.

As shown in FIG. 7, when an object 702 that represents an XML node is arranged to be a database-backed representation of the XML node, a node ID field of object 702 is arranged to contain a pointer 716 into a database 712. A data array field includes a reference 722 to a document or root node 724, which includes a node ID field that includes a pointer 728 into database 712. The relative cost in terms of memory usage within a Java space environment of object 792 is typically a cost which involves a long integer and a flags field.

Figure 8:
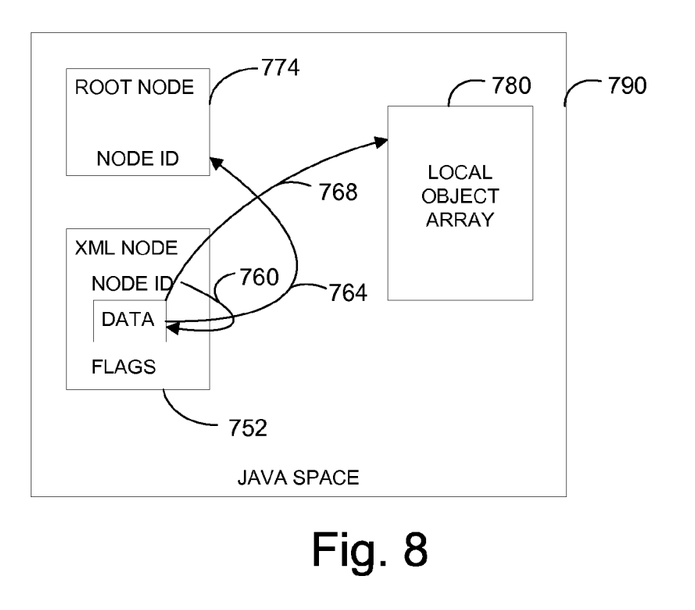
FIG. 8 is a diagrammatic representation of an XML node which references a local object array in accordance with an embodiment of the present invention.

Alternatively, as shown in FIG. 8, when an object 752 that represents an XML node is arranged to be an in-memory representation of the XML node, a node ID field of object 752 includes an index 760 into a data array field. The data array field includes a pointer to a document or root node 774, as well as a reference 768 into a local object array 780 within a Java space environment 790. In one embodiment, substantially all data associated with object 752 may be stored within Java space environment 790. The size of object 752 is may vary such that the size may be determined based on the amount of data that is to be stored in the fields of object 752.

Figure 9A:
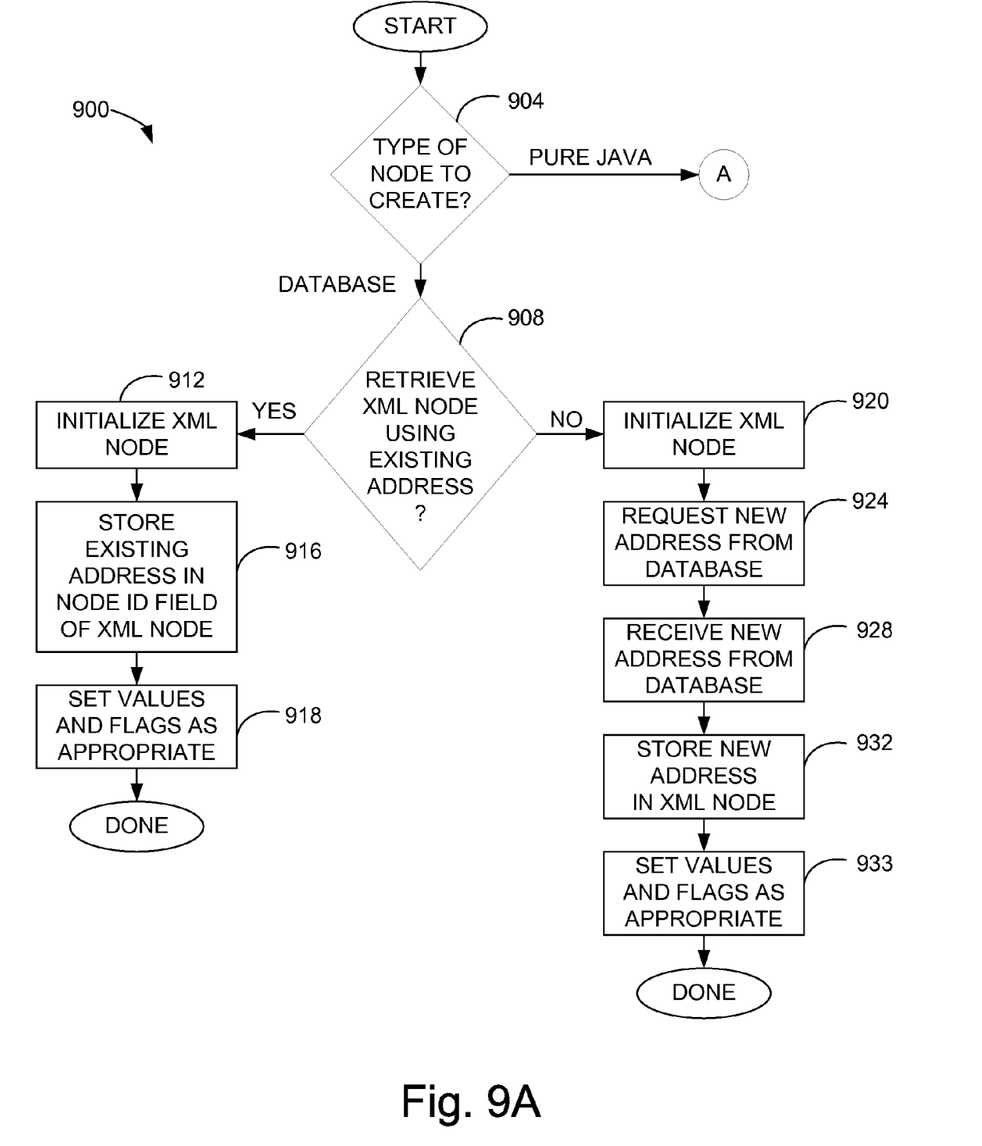
FIGS. 9a and 9b are a process flow diagram which illustrates one method of creating an XML node in accordance with an embodiment of the present invention.
Figure 9B:
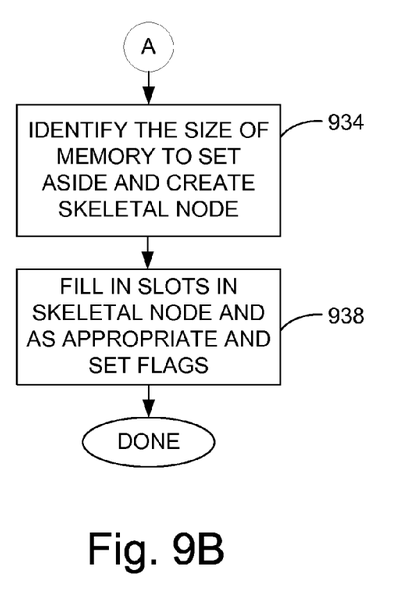

With reference to FIGS. 9a and 9b, the steps associated with one process of creating an XML node that is suitable for use in a unified DOM representation will be described in accordance with an embodiment of the present invention. A process 900 of creating an XML node, i.e., an object which represents an XML node, that presents a single unified implementation view to an end user begins at step 904 in which it is determined what type of node is to be created. In the described embodiment, such a determination is effectively a determination of whether to create a pure Java node, i.e., a node with an in-memory representation, or to create a database-backed node.

If it is determined in step 904 that an XML node that is a "database node" is to be created, then the indication is that an XML node is effectively to be initialized in database space and, hence, that the fields within the object which represents the XML node are to contain information that is consistent with a database-backed implementation. Accordingly, process flow process to step 908 in which it is determined whether the XML node is to be retrieved from the database space, such as by accessing a parent of a node previously initialized. If the node requested exists in the database space, its address is returned and an appropriate XML node is initialized in step 912. Typically, the size of the XML node that is initialized is based upon the amount of memory needed to store data associated with the XML node.

Once the XML node is initialized in step 912, the existing address of the XML node's parent or child is stored in the node ID field of the XML node in step 916. Then, in step 918, values and flags are set in the appropriate fields of the XML node. By way of example, pointers into a database may be set in a data array field, and a flag which identifies the XML node as a database-backed representation may be set in a flags field. After values and flags are set the process of creating an XML node is completed.

Returning back to step 908, if it is determined that a new XML node is to be created, e.g., if it is determined that the a child for an existing node is to be created, then the indication is that the XML node is to be created using a new address. Therefore, in step 920, an XML node is initialized, and a new address is requested from an associated database in step 924. The new address is received from the database in step 928, and is stored in the XML node in step 932. When the new address is stored in the XML node, the field in which the new address is stored is generally a node ID field. After the new address is stored, values and flags are set in other fields as appropriate in step 933, and the process of creating an XML node is completed.

Referring back to step 904, if it is determined that the node that is to be created is a pure Java node, the process flow moves to step 934 in which the size of memory to set aside is identified, and a skeletal XML node is created using the memory. The size of the memory to set aside for the creation of the skeletal XML node is dependent upon a variety of factors which include, but are not limited to, the number of entries in the object array needed by the node. In one embodiment, the number of entries and, hence, the memory needed by an XML node may be a substantially default size that is predetermined by a user.

After the skeletal node is created in step 934, the entries in the object array of the skeletal node are filled in as appropriate, and flags are set as necessary. It should be appreciated that filling in slots may includes setting child nodes associated with the skeletal node. Once the entries in the skeletal node are filled as appropriate, e.g., by filling in links to associated nodes in a object array field, and flags are set, e.g., by setting a flag in a flags field to identify the skeletal node as being a pure Java or in-memory representation of an XML node, the process of creating an XML node which presents a single unified implementation view to an end user is completed.

Figure 10:
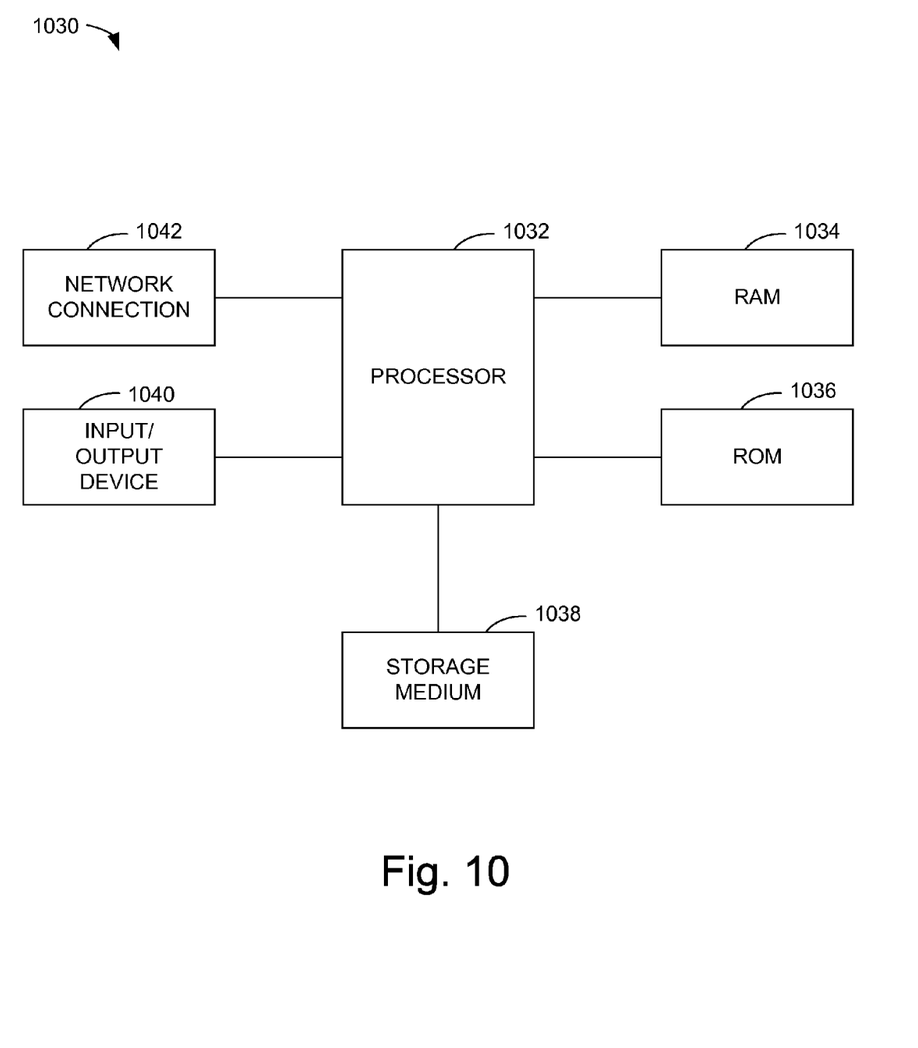
FIG. 10 illustrates a typical, general purpose computing device or computer system suitable for implementing the present invention.

The functionality which enables a pure Java representation of an XML node and a database-backed representation of an XML node to be substantially merged to provide a unified implementation may be provided as a part of an XML developer kit for Java, as for example a Java XDK available from Oracle Corporation of Redwood Shores, Calif. Such an XML developer kit may be arranged to be used within a computer system for XML data processing. FIG. 10 illustrates a typical, general purpose computing device or computer system suitable for implementing the present invention. A computer system 1030 includes any number of processors 1032 (also referred to as central processing units, or CPUs) that are coupled to memory devices including primary storage devices 1034 (typically a random access memory, or RAM) and primary storage devices 1036 (typically a read only memory, or ROM). ROM acts to transfer data and instructions uni-directionally to the CPU 1032, while RAM is used typically to transfer data and instructions in a bi-directional manner.

CPU 1032 may generally include any number of processors. Both primary storage devices 1034, 1036 may include any suitable computer-readable media. A secondary storage medium 1038, which is typically a mass memory device, is also coupled bi-directionally to CPU 1032 and provides additional data storage capacity. The mass memory device 1038 is a computer-readable medium that may be used to store programs including computer code, data, and the like. Mass memory device 1038 may a storage medium such as a hard disk or a tape which is generally slower than primary storage devices 1034, 1036, or mass memory device may be a database. It should be appreciated that the information retained within the mass memory device 1038, may, in appropriate cases, be incorporated in standard fashion as part of RAM 1036 as virtual memory. A specific primary storage device 1034 such as a CD-ROM may also pass data uni-directionally to the CPU 1032.

CPU 1032 is also coupled to one or more input/output devices 1040 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1032 optionally may be coupled to a computer or telecommunications network, e.g., a local area network, an internet network or an intranet network, using a network connection as shown generally at 1042. With such a network connection, it is contemplated that the CPU 1032 might receive information from the network, or might output information to the network in the course of performing the above-described method steps. Such information, which is often represented as a sequence of instructions to be executed using CPU 1032, may be received from and outputted to the network, for example, in the form of a computer data signal embodied in a carrier wave. The above-described devices and materials will be familiar to those of skill in the computer hardware and software arts.

Although only a few embodiments of the present invention have been described, it should be understood that the present invention may be embodied in many other specific forms without departing from the spirit or the scope of the present invention. By way of example, the definition of an XML node class which allows an in-memory representation of an XML node and a database-backed representation of the database node to include the intersection of fields associated with each representation may vary.

It should be appreciated that an XML node class which allows Java objects representing XML nodes to contain the same set of field for both an in-memory representation and a database-backed representation allows for various extensions to be made within systems which use Java objects. For instance, one extension may involve utilizing different back-end storage schemes to support the storage of data used for implementing DOM APIs. Another extension may involve using a compact binary XML representation to store XML data.

In general, the steps associated with the methods of the present invention may vary widely. Steps may be added, removed, altered, and reordered without departing from the spirit or the scope of the present invention. Therefore, the present examples are to be considered as illustrative and not restrictive, and the invention is not to be limited to the details given herein, but may be modified within the scope of the appended claims.

What is claimed is:

1. A method for creating a programming object in a space, the method comprising:
   determining whether a proposed programming object is to represent a pure node, the pure node being arranged to include information that is all in the space, the proposed programming object being arranged to represent an XML node, being arranged to be interoperable with both in-memory and database-backed document programming object model application programming interfaces, and being of a first object class associated with a first set of fields, the first set of fields being common to both a pure node representation and a database-backed node representation;
   when the proposed programming object is not determined to represent the pure node, creating the programming object to represent the database-backed node having at least the first set of fields, the programming object being analogous to the proposed programming object, the database-backed node being arranged to reference information that is in a database, wherein the database is outside of the space; and
   when the proposed programming object is determined to represent the pure node, creating the programming object to represent a pure node having at least the first set of fields, the programming object being analogous to the proposed programming object.

2. The method of claim 1 wherein creating the programming object to represent the database-backed node comprises:
   initializing the programming object, wherein initializing the programming object comprises reserving a portion of the space; and
   setting a first flag in the programming object, the first flag being arranged to indicate that the programming object represents the database-backed node.

3. The method of claim 2 wherein creating the programming object to represent the database-backed node further comprises:
   storing an address in the programming object, the address being arranged to identify the programming object.

4. The method of claim 2 wherein creating the programming object to represent the database-backed node further comprises:
   storing a pointer in the programming object, the pointer being arranged to identify data stored in a database.

5. The method of claim 4 wherein storing the pointer in the programming object comprises storing the pointer in a node identifier field of the programming object.

6. The method of claim 1 wherein creating the programming object to represent the pure node comprises:
   initializing the programming object; and
   setting a first flag in the programming object, the first flag being arranged to indicate that the programming object represents a pure node.

7. The method of claim 6 wherein creating the programming object to represent the pure node further comprises:
   storing data in the programming object.

8. The method of claim 7 wherein storing the data in the programming object comprises storing the data in a data array field of the programming object.

9. The method of claim 1 further comprising:
   setting a first flag in the programming object when the programming object is not determined to represent the pure node, the first flag being set to indicate that the programming object represents the database-backed node; and
   setting the first flag in the programming object when it is determined that the programming object represents the pure node, the first flag being set to indicate that the programming object represents the pure node.

10. The method of claim 1 wherein creating the programming object comprises:
    creating a node identifier field in the programming object, the node identifier field being a long integer field;
    creating a data array field in the programming object, the data array field being an programming object array field; and creating a flags field in the programming object, the flags field being an integer field.

11. The method of claim 1 wherein the programming object is a Java programming object, and the space is a Java space.

12. A computer-program product, the computer-program product being embodied using a computer-readable storage medium, for creating a programming object in a space, the computer-program product comprising:

code devices that cause a determination of whether a proposed programming object is to represent a pure node, the pure node being arranged to include information that is all in the space, the proposed programming object being arranged to represent an XML node, being arranged to be interoperable with both in-memory and database-backed document programming object model application programming interfaces, and being of a first class;

code devices that cause the programming object to be created to represent a database-backed node when the programming object is not determined to represent the pure node, the programming object comprising a first subset of fields associated with the in-memory document programming object model and a second subset of fields associated with the database-backed document programming object model and being analogous to the proposed programming object, the database-backed node being arranged to reference information that is in a database, wherein the database is outside of the space; and code devices that cause the programming object to be created to represent a pure node when the programming object is determined to represent the pure node, the programming object comprising the first subset of fields and the second subset of fields and being analogous to the proposed programming object, the first and second subsets of fields being jointly arranged in both the pure node representation and the database-backed node representation.

13. The computer-program product of claim 12 wherein the code devices that cause the programming object to be created to represent the database-backed node comprise:

code devices that cause the programming object to be initialized, wherein the code devices that cause the programming object to be initialized comprise code devices that cause a portion of the space to be reserved; and code devices that cause a first flag in the programming object to be set, the first flag being arranged to indicate that the programming object represents the database-backed node.

14. The computer-program product of claim 13 wherein the code devices that cause the programming object to be created to represent the database-backed node further comprise:

code devices that cause a pointer to be stored in the programming object, the pointer being arranged to identify data stored in a database.

15. The computer-program product of claim 12 wherein the code devices that cause the programming object to be created to represent the pure node comprise:

code devices that cause the programming object to be initialized; and code devices that cause a first flag to be set in the programming object, the first flag being arranged to indicate that the programming object represents a pure node.

16. The computer-program product of claim 12 further comprising:

code devices that cause a first flag to be set in the programming object when the programming object is not determined to represent the pure node, the first flag is set to indicate that the programming object represents the database-backed node; and code devices that cause the first flag to be set in the programming object when it is determined that the programming object represents the pure node, the first flag is set to indicate that the programming object represents the pure node.

17. The computer-program product of claim 12 wherein the code devices that cause the programming object to be created comprise:

code devices that cause a node identifier field to be created in the programming object, the node identifier field being a long integer field;

code devices that cause a data array field to be created in the programming object, the data array field being an programming object array field; and code devices that cause a flags field to be created in the programming object, the flags field being an integer field.

18. The computer-program product of claim 12 wherein the programming object is a Java programming object, and the space is a Java space.

19. A system for creating an object-oriented programming object in a space, the system comprising:

means of using a processor for determining whether a proposed programming object is to represent a pure node, the pure node being arranged to include information that is all in the space, the proposed programming object being arranged to represent an XML node, being arranged to be interoperable with both in-memory and database-backed document programming object model application programming interfaces, being of a first class having a first set of fields, and being arranged to contain the first set of fields for both an in-memory representation and a database-backed representation;

when the proposed programming object is not determined to represent the pure node, means for creating the object-oriented programming object to represent a database-backed node, the object-oriented programming object being analogous to the proposed programming object, the database-backed node being arranged to reference information that is in a database, wherein the database is outside of the space; and when the proposed programming object is determined to represent the pure node, means for creating the object-oriented programming object to represent a pure node, the object-oriented programming object being analogous to the proposed programming object.

20. The system of claim 19 wherein the means for creating the object-oriented programming object to represent the database-backed node comprise:

means for initializing the object-oriented programming object, wherein initializing the object-oriented programming object comprises reserving a portion of the space; and means for setting a first flag in the object-oriented programming object, the first flag being arranged to indicate that the object-oriented programming object represents the database-backed node.

21. The system of claim 20 wherein the means for creating the object-oriented programming object to represent the database-backed node further comprise:

means for storing a pointer in the object-oriented programming object, the pointer being arranged to identify data stored in a database.

22. The system of claim 19 wherein the means for creating the object-oriented programming object to represent the pure node comprise:
   means for initializing the object-oriented programming object; and
   means for setting a first flag in the object-oriented programming object, the first flag being arranged to indicate that the object-oriented programming object represents a pure node.

23. The system of claim 22 wherein the means for creating the object-oriented programming object to represent the pure node further comprise:
   means for storing data in the object-oriented programming object.

24. The system of claim 19 further comprising:
   means for setting a first flag in the programming object when the programming object is not determined to represent the pure node, the first flag being set to indicate that the programming object represents the database-backed node; and
   means for setting the first flag in the programming object when it is determined that the programming object represents the pure node, the first flag being set to indicate that the programming object represents the pure node.

25. The system of claim 19 wherein the means for creating the object-oriented programming object comprise:
   means for creating a node identifier field in the object-oriented programming object, the node identifier field being a long integer field;
   means for creating a data array field in the object-oriented programming object, the data array field being an programming object array field; and
   means for creating a flags field in the object-oriented programming object, the flags field being an integer field.

26. The method of claim 1 further comprising:
   storing the programming object in random access memory.

27. The method of claim 26 wherein creating the programming object to represent the database-backed node comprises:
   initializing the programming object, wherein initializing the programming object comprises reserving a portion of the space; and
   setting a first flag in the programming object, the first flag being arranged to indicate that the programming object represents the database-backed node.

28. The method of claim 27 wherein creating the programming object to represent the database-backed node further comprises:
   storing an address in the programming object, the address being arranged to identify the programming object.

29. The method of claim 27 wherein creating the programming object to represent the database-backed node further comprises:
   storing a pointer in the programming object, the pointer being arranged to identify data stored in a database.

30. The method of claim 29 wherein storing the pointer in the programming object comprises storing the pointer in a node identifier field of the programming object.

31. The method of claim 26 wherein creating the programming object to represent the pure node comprises:
   initializing the programming object; and
   setting a first flag in the programming object, the first flag being arranged to indicate that the programming object represents a pure node.

32. The method of claim 31 wherein creating the programming object to represent the pure node further comprises:
   storing data in the programming object.

33. The method of claim 32 wherein storing the data in the programming object comprises storing the data in a data array field of the programming object.

34. The method of claim 26 further comprising:
   setting a first flag in the programming object when the programming object is not determined to represent the pure node, the first flag being set to indicate that the programming object represents the database-backed node; and
   setting the first flag in the programming object when it is determined that the programming object represents the pure node, the first flag being set to indicate that the programming object represents the pure node.

35. The method of claim 26 wherein creating the programming object comprises:
   creating a node identifier field in the programming object, the node identifier field being a long integer field;
   creating a data array field in the programming object, the data array field being an programming object array field; and
   creating a flags field in the programming object, the flags field being an integer field.

36. The method of claim 26 wherein the programming object is a Java programming object, and the space is a Java space.

37. The method of claim 1 wherein generating the programming object comprises:
   creating fields associated with representing an XML node, wherein the fields for an in-memory representation are the same as for a database-backed representation of the XML node.

38. The method of claim 1 wherein generating the programming object comprises:
   creating fields to represent the XML node, wherein the created fields are used in representing the XML node whether the XML node is a pure node or a database-backed node.

39. The method of claim 1 wherein generating the programming object comprises:
   creating all fields associated with the in-memory implementation of the XML node and all fields associated with the database-backed implementation of the XML node.

40. The method of claim 1 wherein the programming object comprises at least one field that will be used in the in-memory implementation of the XML node or the database-backed implementation of the XML node.

41. The method of claim 1 wherein the programming object is of at most one programming object class representing an XML node, wherein the XML node is a pure node or a database-backed node.

42. The method of claim 41 wherein the programming object class is compatible with a single, unified document programming object model application programming interface.

43. A method for creating a programming object in a space comprising:
   receiving a request to create a proposed programming object in the space, wherein the proposed programming object represents at least one of a pure node or database-backed node, is arranged to represent an XML node, and is of a first class;
   providing shared fields, wherein the shared fields allow the proposed programming object to be interoperable with both in-memory and database-backed document programming object model application programming interfaces;

after determining the proposed programming object is not to represent a pure node, creating the programming object comprising at least the shared fields to represent a database-backed node, the programming object being analogous to the proposed programming object, wherein the database-backed node is arranged to reference information in a database and the database is outside of the space; and after determining the proposed programming object is to represent a pure node having at least the shared fields, creating the programming object comprising at least the shared fields to represent a pure node, the programming object being analogous to the proposed programming object, wherein the pure node is arranged to include information all in the space.

44. The method of claim 43 wherein the creating the programming object comprising at least the shared fields to represent a database-backed node comprises storing a first data in a first shared field of the shared fields, and the creating the programming object comprising at least the shared fields to represent a pure node comprises storing a second data in the first shared field of the shared fields, wherein the second data is different from the first data.

45. The method of claim 43 wherein the creating the programming object comprising at least the shared fields to represent a database-backed node comprises storing a first data in a first field that is not one of the shared fields, and the creating the programming object comprising at least the shared fields to represent a pure node comprises storing the first data in a second field that is not one of the shared fields, wherein the same first data is stored in the first and second fields, but the first and second fields are not shared field.

46. The method of claim 45 wherein the creating the programming object comprising at least the shared fields to represent a database-backed node comprises storing a second data in a third field of the shared fields, and the creating the programming object comprising at least the shared fields to represent a pure node comprises storing the second data in the third field of the shared fields, wherein the same second data is stored in the third field of the programming object as both a database-backed node and pure node.

47. The method of claim 43 wherein the creating the programming object comprising at least the shared fields to represent a database-backed node comprises storing a first data in a first field of the shared fields, and the creating the programming object comprising at least the shared fields to represent a pure node comprises storing the first data in the first field of the shared fields, wherein the same first data is stored in the first field of the programming object as both a database-backed node and pure node.

48. The method of claim 43 wherein the shared fields are not data stored in the database.

49. The method of claim 43 wherein the shared fields are attributes of an object-oriented class.

50. The method of claim 43 wherein the shared fields are an intersection of a first set of fields associated with pure nodes and a second set of fields associated with database-backed nodes.

51. A computer-program product, the computer-program product being embodied using a computer-readable storage medium, for creating a programming object in a space, the computer-program product comprising:

code devices that cause a determination of whether a proposed programming object is to represent a pure node, the pure node being arranged to include information that is all in the space, the proposed programming object being arranged to represent an XML node, being arranged to be interoperable with both in-memory and database-backed document programming object model application programming interfaces, and being of a first object class associated with a first set of fields, the first set of fields being common to both a pure node representation and a database-backed node representation;

code devices that cause the programming object to be created to represent the database-backed node having at least the first set of fields when the proposed programming object is not determined to represent the pure node, the programming object being analogous to the proposed programming object, the database-backed node being arranged to reference information that is in a database, wherein the database is outside of the space; and code devices that cause the programming object to be created to represent a pure node having at least the first set of fields when the proposed programming object is determined to represent the pure node, the programming object being analogous to the proposed programming object.

52. The computer-program product of claim 51 wherein the code devices that cause the programming object to be created to represent the database-backed node comprise:

code devices that cause the programming object to be initialized, wherein the code devices that cause the programming object to be initialized comprise code devices that cause a portion of the space to be reserved; and code devices that cause a first flag in the programming object to be set, the first flag being arranged to indicate that the programming object represents the database-backed node.

53. The computer-program product of claim 52 wherein the code devices that cause the programming object to be created to represent the database-backed node comprise:

code devices that cause an address to be stored in the programming object, the address being arranged to identify the programming object.

54. The computer-program product of claim 52 wherein the code devices that cause the programming object to be created to represent the database-backed node comprise:

code devices that cause a pointer to be stored in the programming object, the pointer being arranged to identify data stored in a database.

55. The computer-program product of claim 54 wherein the code devices that cause a pointer to be stored in the programming object comprise code devices that cause the pointer to be stored in a node identifier field of the programming object.

56. The computer-program product of claim 51 wherein the code devices that cause the programming object to be created to represent a pure node comprise:

code devices that cause the programming object to be initialized; and code devices that cause a first flag in the programming object to be set, the first flag being arranged to indicate that the programming object represents a pure node.

57. The computer-program product of claim 56 wherein the code devices that cause the programming object to be created to represent a pure node comprise:
  code devices that cause data in the programming object to be stored.

58. The computer-program product of claim 57 wherein the code devices that cause data in the programming object to be stored comprise code devices that cause the data to be stored in a data array field of the programming object.

59. The computer-program product of claim 51 comprising:
  code devices that cause a first flag to be set in the programming object when the programming object is not determined to represent the pure node, the first flag being set to indicate that the programming object represents the database-backed node; and
  code devices that cause the first flag to be set in the programming object when it is determined that the programming object represents the pure node, the first flag being set to indicate that the programming object represents the pure node.

60. The computer-program product of claim 51 wherein the programming object is a Java programming object, and the space is a Java space.

* * * * *

UNITED STATES PATENT AND TRADEMARK OFFICE
CERTIFICATE OF CORRECTION

PATENT NO. : 7,870,112 B2  Page 1 of 1
APPLICATION NO. : 10/880950
DATED : January 11, 2011
INVENTOR(S) : K Karun et al.

It is certified that error appears in the above-identified patent and that said Letters Patent is hereby corrected as shown below:

On the title pg, Item (54), in "Title", line 1, after "FOR" insert -- A --.

In column 1, line 1, after "FOR" insert -- A --.

In column 8, line 5, delete "the a" and insert -- a --, therefor.

In column 10, line 48, in claim 8, after "storing" delete "the".

Signed and Sealed this
Third Day of January, 2012

David J. Kappos
*Director of the United States Patent and Trademark Office*